United States Patent
Adema

(10) Patent No.: US 12,333,971 B1
(45) Date of Patent: Jun. 17, 2025

(54) LINEAR PIXEL SHIFTING FOR A NON-RECTILINEAR PIXEL ARRANGEMENT

(71) Applicant: Google LLC, Mountain View, CA (US)

(72) Inventor: Daniel Adema, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/598,865

(22) Filed: Mar. 7, 2024

Related U.S. Application Data

(60) Provisional application No. 63/625,578, filed on Jan. 26, 2024.

(51) Int. Cl.
  *G09G 3/00* (2006.01)
  *G09G 3/32* (2016.01)
  *H04N 9/31* (2006.01)

(52) U.S. Cl.
  CPC ............... *G09G 3/007* (2013.01); *G09G 3/32* (2013.01); *H04N 9/3188* (2013.01); *G09G 2340/0407* (2013.01)

(58) Field of Classification Search
  CPC .. G09G 3/007; G09G 3/32; G09G 2340/0407; H04N 9/3188
  See application file for complete search history.

(56) References Cited

U.S. PATENT DOCUMENTS

| | | | |
|---|---|---|---|
| 6,791,512 B1 | 9/2004 | Shimada | |
| 11,126,069 B2 * | 9/2021 | Chang | G02F 1/091 |
| 11,886,067 B2 * | 1/2024 | Wakabayashi | G01J 1/0411 |
| 2005/0134805 A1 | 6/2005 | Conner et al. | |
| 2005/0243290 A1 | 11/2005 | Gupta | |
| 2016/0091773 A1 * | 3/2016 | Mizoguchi | G03B 21/14 359/199.1 |
| 2016/0227177 A1 * | 8/2016 | Mizoguchi | G03B 21/142 |
| 2016/0286183 A1 | 9/2016 | Haraguchi et al. | |
| 2016/0370575 A1 * | 12/2016 | Lin | G02B 26/085 |
| 2020/0174246 A1 * | 6/2020 | Wakabayashi | G03B 21/006 |
| 2021/0096449 A1 * | 4/2021 | Hirakura | H01F 7/122 |
| 2022/0137493 A1 * | 5/2022 | Chen | H02K 41/0354 353/122 |
| 2022/0163829 A1 * | 5/2022 | Wakabayashi | G02B 26/08 |

* cited by examiner

Primary Examiner — Michael Pervan
(74) Attorney, Agent, or Firm — Brake Hughes Bellermann LLP

(57) ABSTRACT

An illustrative method includes displacing an optical plate in accordance with an oscillating wobulation pattern along a single rotational axis, the optical plate being positioned in front of an array of pixels having a non-rectilinear pixel arrangement. The method also includes driving the array of pixels in connection with the oscillating wobulation pattern such that: the array of pixels displays a first image while the optical plate is in a first region of a period of the oscillating wobulation pattern, the array of pixels displays a second image while the optical plate is in a second region of the period of the oscillating wobulation pattern, and the array of pixels displays a third image while the optical plate is in a third region of the period of the oscillating wobulation pattern. Corresponding methods and systems are also disclosed.

20 Claims, 12 Drawing Sheets

LINEAR PIXEL SHIFTING FOR A NON-RECTILINEAR PIXEL ARRANGEMENT

CROSS-REFERENCE TO RELATED APPLICATION

This application claims priority to U.S. Provisional Patent Application No. 63/625,578, filed on Jan. 26, 2024, the disclosure of which is incorporated by reference herein in its entirety.

BACKGROUND

Digitally-encoded images may be presented to viewers using a variety of different types of image displays featured in a variety of different types of devices. For example, personal computing devices (e.g., laptops, tablets, etc.), mobile devices (e.g., smartphones, electronic readers, etc.), wearable devices (e.g., smart watches, etc.), extended reality devices (e.g., virtual and augmented reality headsets, etc.), televisions, and various other devices all may feature image displays configured to present images to users of the devices.

SUMMARY

Implementations described herein implement linear pixel shifting for non-rectilinear pixel arrangements to effectively reduce pixel pitch by creating an illusion that multiple complete sets of pixels are present when only one physical set of pixels actually exists. Pixel shifting for non-rectilinear pixel arrangements (e.g., in which pixels are of non-uniform sizes, non-uniform shapes, etc.) may introduce certain complexities that are not associated with standard rectilinear pixel arrangements (e.g., in which pixels of uniform size and shape are arranged in a rectilinear grid). Accordingly, implementations described herein not only address pixel shifting techniques that may be employed with rectilinear displays but also techniques that are compatible with non-rectilinear displays. In this way, pixel shifting benefits may be combined with benefits of non-rectilinear displays (described in more detail below) in ways that do not introduce undesirable side effects. For example, certain pixel shifting techniques, when applied to a non-rectilinear display, produce the increased apparent pixel density at the cost of also introducing 2D non-uniformity in the pixel distribution. As will be described and made apparent below, however, three-position linear pixel shifting techniques for non-rectilinear pixel arrangements described herein are not limited by any such costs or compromises, and support full 2D uniformity of the pixels as they are shifted.

As one example implementation, an illustrative method for linear pixel shifting for non-rectilinear pixel arrangements may include: 1) displacing an optical plate in accordance with an oscillating wobulation pattern along a single rotational axis, and 2) driving an array of pixels in connection with the oscillating wobulation pattern. In this example, the array of pixels may have a non-rectilinear pixel arrangement (such as described and illustrated herein) and the optical plate may be positioned in front of the array of pixels. The driving of the array of pixels in connection with the oscillating wobulation pattern may then be performed such that: 1) the array of pixels displays a first image while the optical plate is in a first region of the oscillating wobulation pattern, 2) the array of pixels displays a second image while the optical plate is in a second region of the period of the oscillating wobulation pattern, and 3) the array of pixels displays a third image while the optical plate is in a third region of the period of the oscillating wobulation pattern.

As another example implementation, another illustrative method for linear pixel shifting for non-rectilinear pixel arrangements may include: 1) for an actuator on which an optical plate is mounted so as to be positioned in front of an array of pixels having a non-rectilinear arrangement, driving the actuator to displace the optical plate in accordance with an oscillating wobulation pattern along a single rotational axis; 2) driving the array of pixels to display a first subframe of an image frame while the optical plate is in a first region of a period of the oscillating wobulation pattern; 3) driving the array of pixels to display a second subframe of the image frame while the optical plate is in a second region of the period of the oscillating wobulation pattern; and 4) driving the array of pixels to display a third subframe of the image frame while the optical plate is in a third region of the period of the oscillating wobulation pattern.

As yet another example implementation, an illustrative display system may include: 1) an optical plate; 2) an array of pixels having a non-rectilinear arrangement; 3) an actuator on which the optical plate is mounted so as to be positioned in front of the array of pixels, the actuator being configured to displace the optical plate in accordance with an oscillating wobulation pattern along a single rotational axis; and 4) a pixel controller configured to drive the array of pixels. The pixel controller in this example may be configured to drive the array of pixels to display a first image while the optical plate is in a first region of a period of the oscillating wobulation pattern, a second image while the optical plate is in a second region of the period of the oscillating wobulation pattern, and a third image while the optical plate is in a third region of the period of the oscillating wobulation pattern.

The details of these and other implementations are set forth in the accompanying figures and the description below. Other features will also be made apparent from the following description, drawings, and claims.

DETAILED DESCRIPTION

Figure 1:
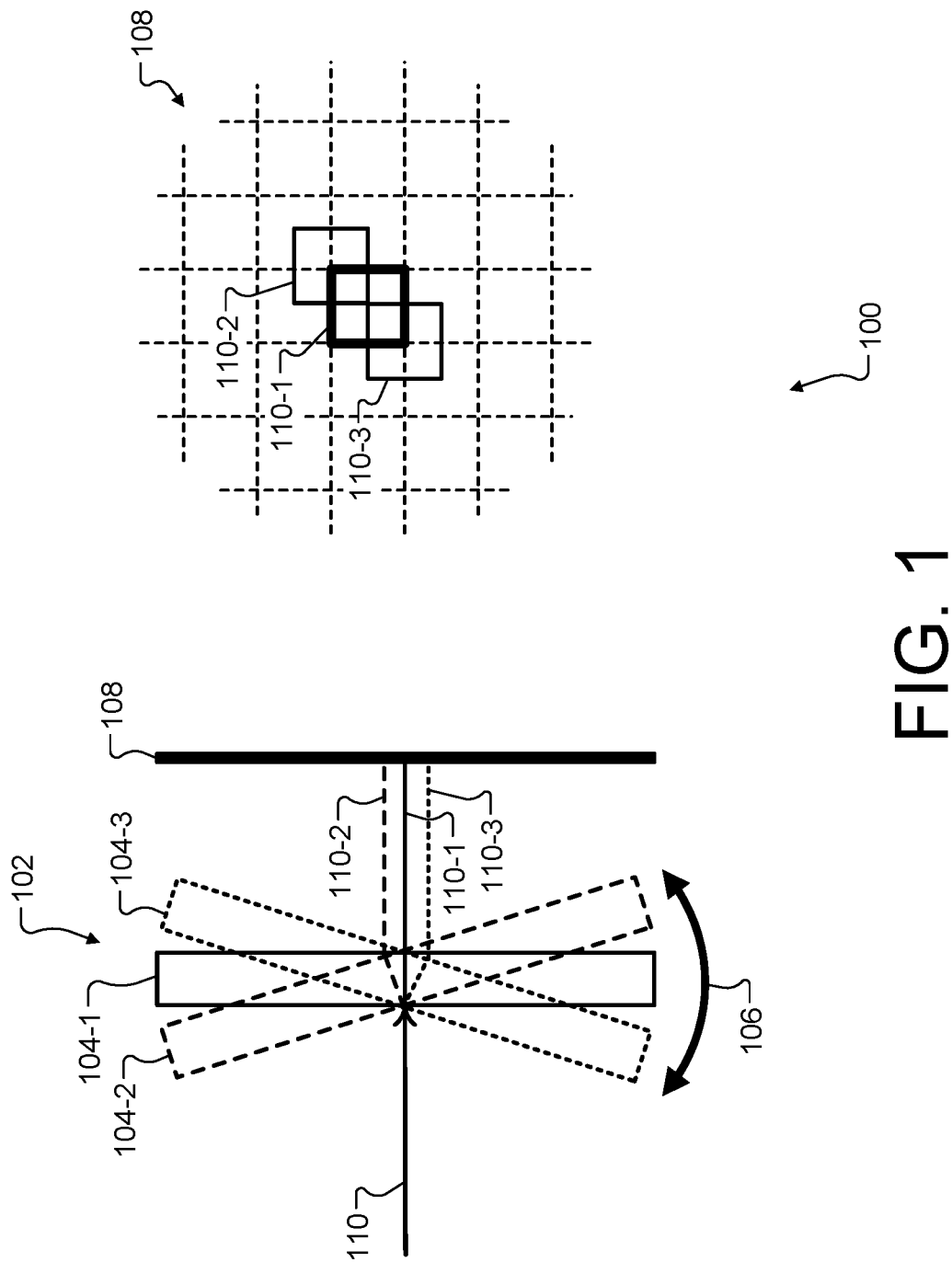
FIG. 1 shows aspects of one illustrative implementation of linear pixel shifting for a pixel arrangement in accordance with principles described herein.

Methods and systems for linear pixel shifting for a non-rectilinear pixel arrangement are described herein. For various reasons, it may be desirable for a pixel panel of an image display to have a small pixel pitch, or, in other words, for the pixels within the panel to be as small and densely packed as possible. One advantage of a small pixel pitch is that a large number of pixels may fit on the panel, leading to an image display with a sharp, high-resolution picture. Another advantage is that, if the pixel panel is integrated within a head-mounted display (e.g., of an extended reality presentation device such as a virtual reality or augmented reality device), a small pixel pitch may allow for the head-mounted enclosure of the device to be made more compact, comfortable, and stylish than it could be with a larger pixel pitch. This is because an optical track for the pixel panel may be made smaller (without sacrificing resolution) when more pixels can be packed into a smaller area.

Though pixel fabrication processes are continually being developed to make pixels ever smaller and denser, other techniques may supplement or complement these efforts to increase the apparent density of pixels on a panel (i.e., to decrease the apparent pixel pitch) beyond the physical density that can be manufactured on a given pixel panel. One such technique described herein is called pixel shifting (also referred to using terms such as super-resolution, wobulation, and/or other terms). Pixel shifting works by creating an illusion of multiple distinct arrays of pixels (including overlapping pixels) based on the physical array of pixels that actually exists. For example, when displaying a particular image frame (e.g., from a frame sequence such as included in an instance of media content like a movie), a system may generate multiple subframes of the image frame and use an optical image shifting mechanism to displace the projected image of each subframe by a fraction of a pixel (e.g., one half of the pixel, etc.).

When the subframes are projected in rapid succession (in accordance with the movement of the shifting mechanism), two distinct sets of pixels can be made to appear, to the human eye, as if they are being projected simultaneously and superimposed. Accordingly, in one example, the apparent pixel pitch may be decreased (due to the illusion that two or more times as many pixels are present in a given space as are physically present), thereby increasing the apparent pixel density and the apparent resolution of the pixel panel as compared to the actual, physical density and resolution.

Accordingly, pixel shifting may provide a technical solution to the technical problem of how to increase pixel density (and decrease pixel pitch) on physical pixel panels used for image displays. The technical effect of this solution is that a given pixel panel will effectively possess a significantly greater pixel density that allows it to provide resolution and device portability benefits mentioned above, as well as other benefits as are known to be associated with low pixel pitch and/or as will be made apparent in the description below.

Various implementations will now be described in more detail with reference to the figures. It will be understood that particular implementations described below are provided as non-limiting examples and may be applied in various situations. Additionally, it will be understood that other implementations not explicitly described herein may also fall within the scope of the claims set forth below. Systems and methods described herein for linear pixel shifting for a non-rectilinear pixel arrangement may result in any or all of the technical effects mentioned above, as well as various additional effects and benefits that will be described and/or made apparent below.

FIG. 1 shows aspects of one illustrative implementation 100 of linear pixel shifting for a pixel arrangement in accordance with principles described herein. In the example of implementation 100, an optical plate 102 is shown from a side view in three positions 104-1, 104-2, and 104-3. Positions 104-1, 104-2, and 104-3 (collectively referred to as positions 104) will be understood to illustrate certain ways that optical plate 102 may be oriented (e.g., positioned, posed, etc.) as the optical plate is displaced in accordance with an oscillating wobulation pattern 106. Accordingly, different line styles are used to illustrate each position 104 to indicate that the plate is moving between positions 104 but is only in one at a time. As used herein, an oscillating wobulation pattern refers to a pattern in which an optical plate such as optical plate 102 may be moved (e.g., rotated, swiveled, wobbled, etc.) in order to implement pixel shifting in a particular way. For example, as will be described and illustrated in more detail below, an oscillating wobulation pattern may be implemented using one or more sinusoidal functions (e.g., a monotone sinusoid, a multitone sinusoid, etc.), step functions, or the like. For the illustrative purposes of implementation 100, oscillating wobulation pattern 106 may thought of as implementing a step function that, during a single period of the pattern, causes optical plate 102 to begin at position 104-1 for one time unit, be displaced to position 104-2 for two time units, return to position 104-1 for one time unit, be displaced to position 104-3 for two time units, and then return to position 104-1 for the next period.

With optical plate 102 wobbling or rotating in this way, pixel shifting may be performed on a screen 108 onto which light 110 is being projected through optical plate 102. In some examples, screen 108 may represent a projection screen onto which an image is projected (e.g., either from the front or from the back). Examples of this type may include movie screens, computer monitors, televisions, or mobile device screens, or the like. In other examples, screen 108 may represent another type of display, such as an extended reality head-mounted display. Screen 108 may represent an optical aperture into a waveguide for a lens of augmented reality glasses, for example, or an opaque or semi-transparent screen of a virtual reality headset.

Light 110 may originate from a pixel panel featuring a plurality of pixels. For example, the pixel panel may implement micro light emitting diodes (pLEDs) or another suitable type of light emitting elements as may serve a particular implementation. For clarity of illustration, light 110 will be understood as representing the light from a single pixel (e.g., a single µLED or other light emitting element), though it will be understood that the pixel may be surrounded on one or more sides by other similar pixels in a pixel panel.

When optical plate 102 is in position 104-1, light 110 is shown in the side view to traverse straight through optical plate 102 to screen 108 as light 110-1. Light 110 is slightly displaced, however, when optical plate 102 oscillates to the other positions 104. For instance, as shown, light 110 is shown in the side view to be slightly displaced upwards to light 110-2 when optical plate 102 is in position 104-2, and to be slightly displaced downwards to light 110-3 when optical plate 102 is in position 104-3. The line styles of light 110-1, 110-2, and 100-3 are shown to match the line styles depicting the respective positions 104 to illustrate that the position of optical plate 102 causes the displacement in where the light intersects with screen 108. In this example, optical plate 102 may be wobbled over a single axis, such that light 110 may move back and forth on screen 108 in a linear manner. As such, virtual pixels produced by light 110-1, 110-2, and 110-3 as the plate wobbles according to the oscillating wobulation pattern are collinearly positioned. In some examples, the linear projection channel (i.e., the line on which the pixels are collinear) may be rectified with respect to the pixel array (e.g., a horizontal line or a vertical line, etc.). In other examples, however, the orientation of the axis on which optical plate 102 wobbles may be such that the virtual pixels may be collinear on a non-rectified (e.g., diagonal) projection channel with respect to the array.

To illustrate, a straight-on view of screen 108 is depicted next to the side view in FIG. 1. In this view, a first virtual pixel associated with light 110-1 is shown in bold and is surrounded by an array of other pixels outlined with thin dotted lines. It will be understood that an array of pixels (including the pixel associated with light 110-1) may be presented in these positions on screen 108 when optical plate 102 is in position 104-1. As optical plate 102 is displaced in accordance with oscillating wobulation pattern 106, however, the entire pixel array may shift along a diagonal projection channel cutting through the pixels up and to the right. To illustrate, a second virtual pixel associated with light 110-2 is shown to indicate the position of the pixel associated with light 110 when optical plate 102 is displaced to position 104-2. A third virtual pixel associated with light 110-3 is then shown to indicate the position of the same pixel associated with light 110 when optical plate 102 is displaced to position 104-3. While only one physical pixel (associated with light 110) is shown to be displaced to the three positions in FIG. 1 (making three different virtual pixels associated with light 110-1, 110-2, and 110-3), it will be understood that all of the physical pixels in the array may be oscillating back and forth in a similar way to effectively produce three entire arrays of virtual pixels based on the one array of physical pixels. In this example, as shown, the physical pixel may be shifted to different virtual pixels that overlap with one another (e.g., virtual pixels associated with light 110-2 and 110-3 are both positioned so as to overlap the virtual pixel associated with light 110-1) along a linear diagonal.

The pixel array shown in FIG. 1 depicts a pixel arrangement in which the pixels are all equally sized, equally shaped (square shaped in this example), and arranged in even horizontal rows and vertical columns. This type of pixel arrangement is referred to herein as a rectilinear pixel arrangement. As shown, this type of rectilinear pixel arrangement may be well served by a linear oscillating wobulation pattern with a period divided into three regions represented by the three different positions 104 of optical plate 102 (and the different corresponding virtual pixels represented by light 110-1, 110-2, and 110-3). For example, as mentioned above, this oscillating wobulation pattern 106 may result in three times as many virtual pixels as there are physical pixels in the array. For rectilinear pixel arrangements such as illustrated in FIG. 1, simpler oscillating wobulation patterns (e.g., with only two positions for the optical plate, etc.) could also be used without introducing negative effects. As will be illustrated in more detail below, however, the same may not be true for certain non-rectilinear pixel arrangements. In these non-rectilinear examples, a linear, three-position oscillating wobulation pattern such as oscillating wobulation pattern 106 may be especially advantageous, as will be described.

Figure 2:
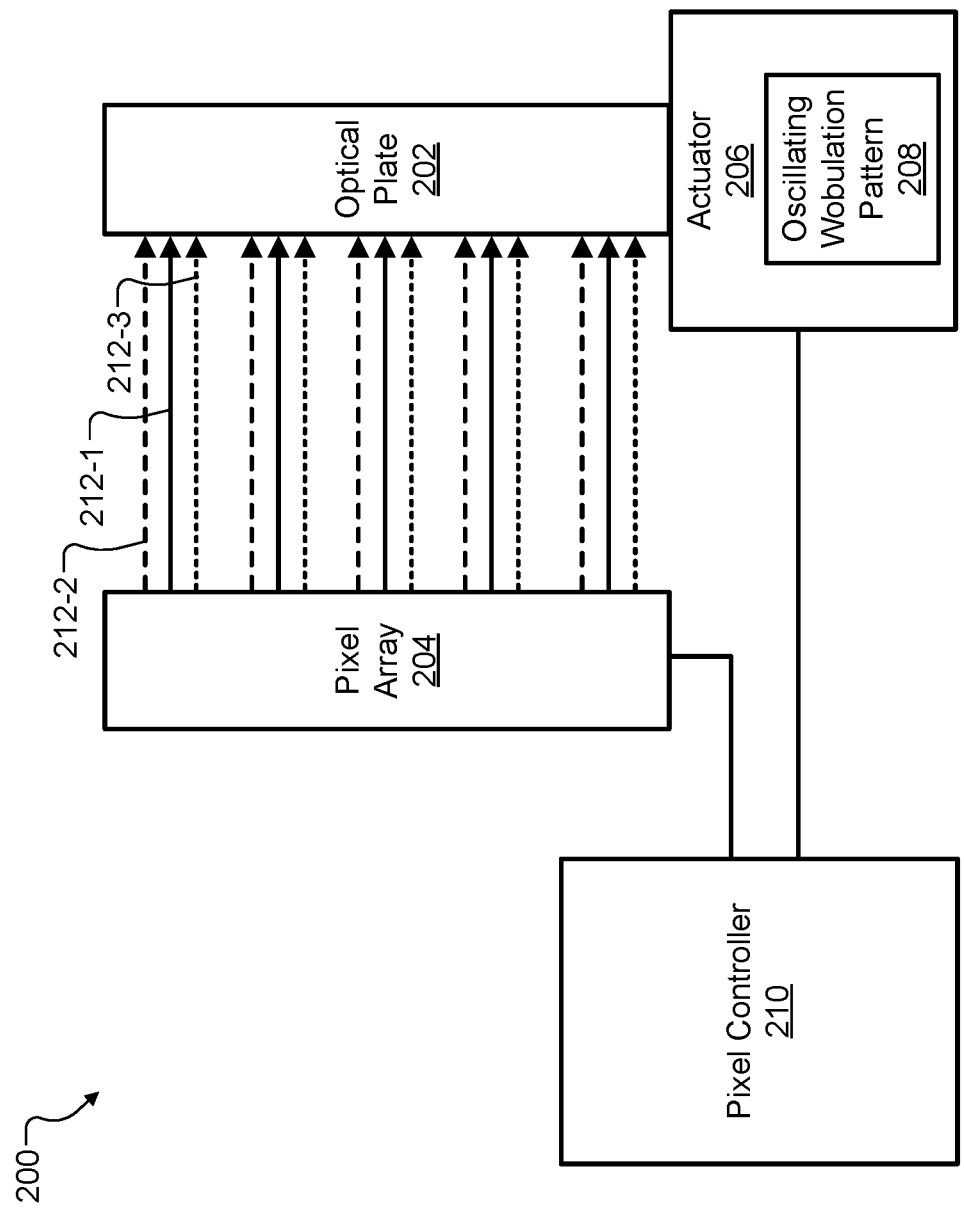
FIG. 2 shows an illustrative display system configured to perform linear pixel shifting for a non-rectilinear pixel arrangement in accordance with principles described herein.

FIG. 2 shows an illustrative display system 200 configured to perform linear pixel shifting for a non-rectilinear pixel arrangement in accordance with principles described herein. As shown, display system 200 includes an optical plate 202, a pixel array 204 having a non-rectilinear arrangement and an actuator 206 on which the optical plate is mounted so as to be positioned in front of pixel array 204. The actuator may be configured to displace optical plate 202 in accordance with an oscillating wobulation pattern 208 along a single rotational axis (e.g., so as to displace pixels along a line such as the diagonal line described above in relation to FIG. 1). Display system 200 is further shown to include a pixel controller 210 that is configured to drive pixel array 204 in connection with (e.g., based on, in synchrony with, etc.) movements of actuator 206 as it implements oscillating wobulation pattern 208. To this end, pixel controller 210 may also control actuator 206, be controlled by a common signal as is controlling actuator 206, receive a signal from actuator 206 indicative of the how actuator 206 is displacing optical plate 202 at any given time, or otherwise be synchronized with actuator 206.

Each period of oscillating wobulation pattern 208 may be divided into three different regions. For example, if oscillating wobulation pattern 208 is implemented as a step function such as described in relation to implementation 100 above, one region may be associated with a first position of the optical plate (e.g., position 104-1 in implementation 100), another region may be associated with a second position of the optical plate (e.g., position 104-2 in implementation 100), and the third region may be associated with a third position of the optical plate (e.g., position 104-3 in implementation 100). While such a step function is relatively simple in concept, however (thus making for a convenient example for illustrative and descriptive purposes), step functions may introduce additional design complexity and disadvantages as compared to other potential functions that can be used to implement oscillating wobulation pattern 208. Accordingly, as will be described in more detail below, other functions (sinusoidal functions, etc.) may be used to implement oscillating wobulation pattern 208 as may serve a particular implementation.

In any case, and however the regions are divided up (various examples of which will be illustrated and described below), each period of oscillating wobulation pattern 208 may include three regions and pixel controller 210 may drive pixel array 204 in accordance with which region optical plate 202 is in at a given time. Specifically, pixel controller 210 may drive pixel array 204 to display: 1) a first image 212-1 while optical plate 202 is in a first region of a period of oscillating wobulation pattern 208, 2) a second image 212-2 while optical plate 202 is in a second region of the period of oscillating wobulation pattern 208, and 3) a third image 212-3 while optical plate 202 is in a third region of the period of oscillating wobulation pattern 208. To illustrate these three images, FIG. 2 depicts various sets of three arrows extending from pixel array 204 to optical plate 202. Each set of three arrows will be understood to represent light from a single pixel, similar to light 110 described above. While only the top set of arrows is labeled with reference numbers for images 212-1, 212-2, and 212-3, the differing line styles show that each set of three arrows similarly represents all three images. At different times, the light of the physical pixel represented by the arrows may be changed by pixel array 204 (as controlled by pixel controller 210) to represent a different one of three virtual pixels, based on which of the three regions of oscillating wobulation pattern 208 optical plate 202 is in. Accordingly, all three images 212-1, 212-2, and 212-3 may be presented in rapid succession to appear to be overlaid at slightly offset locations (e.g., on a display not explicitly shown in FIG. 2), thereby creating an illusion that an image with virtual pixels associated with all three images 212-1, 212-2, and 212-3 is being presented.

Display system 200 may include the elements illustrated in FIG. 2 and/or any other suitable elements as may serve a particular implementation. In one implementation, pixel array 204 may be implemented by micro-LED elements of a micro-LED panel. In other implementations, the array of pixels could be implemented by other types of picture elements in other types of image display panels (e.g., liquid crystal display (LCD) panels, digital light projection (DLP) panels, etc.). The panel implementing pixel array 204 could be included in a head-mounted display of an extended reality presentation device or could be integrated with other types of devices mentioned herein (e.g., mobile devices, televisions, computer monitors, etc.) in other examples.

In certain implementations, optical plate 202 may be implemented as a glass plate that is configured to allow light from the array of pixels to pass through at an angle determined by how far the glass plate is displaced by actuator 206 (e.g., in accordance with oscillating wobulation pattern 208). In other implementations, optical plate 202 may be implemented in other ways, such as using materials other than glass (e.g., materials with other optical properties desired for a particular application) or using a reflective surface (e.g., a mirror that reflects the light from the array of pixels to a different projection site, rather than allowing the light to pass through). The actuator 206 to which optical plate 202 is mounted may include any suitable mechanism for displacing (e.g., oscillating, moving, etc.) the optical plate in accordance with a desired pattern for a given implementation. For instance, actuator 206 may be implemented as a voice coil, a piezo actuator, or another suitable actuator configured to be driven and controlled such that optical plate 202 wobbles or oscillates in accordance with the desired oscillation wobulation pattern 208, which may be implemented using any wobulation patterns described herein.

Figure 3:
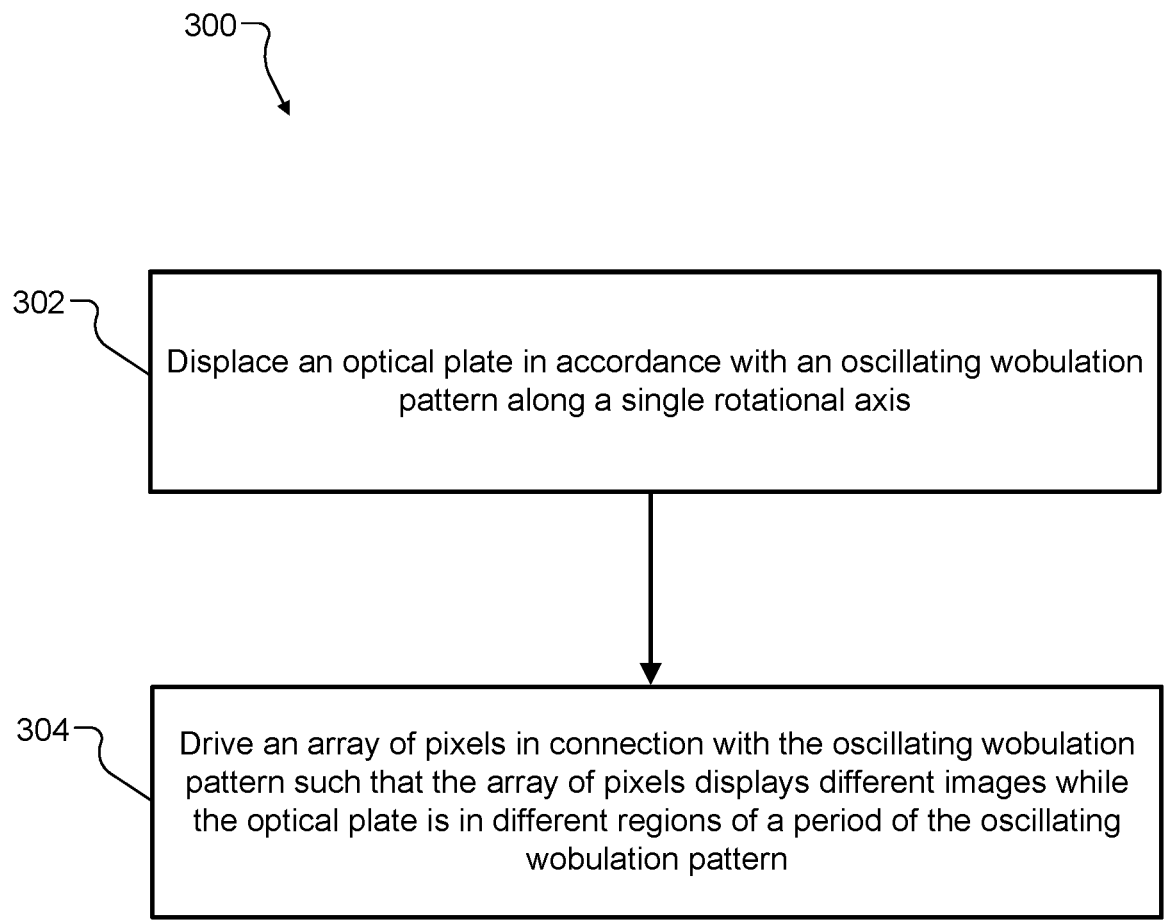
FIGS. 3 and 4 show illustrative methods for performing linear pixel shifting for a non-rectilinear pixel arrangement in accordance with principles described herein.
Figure 4:
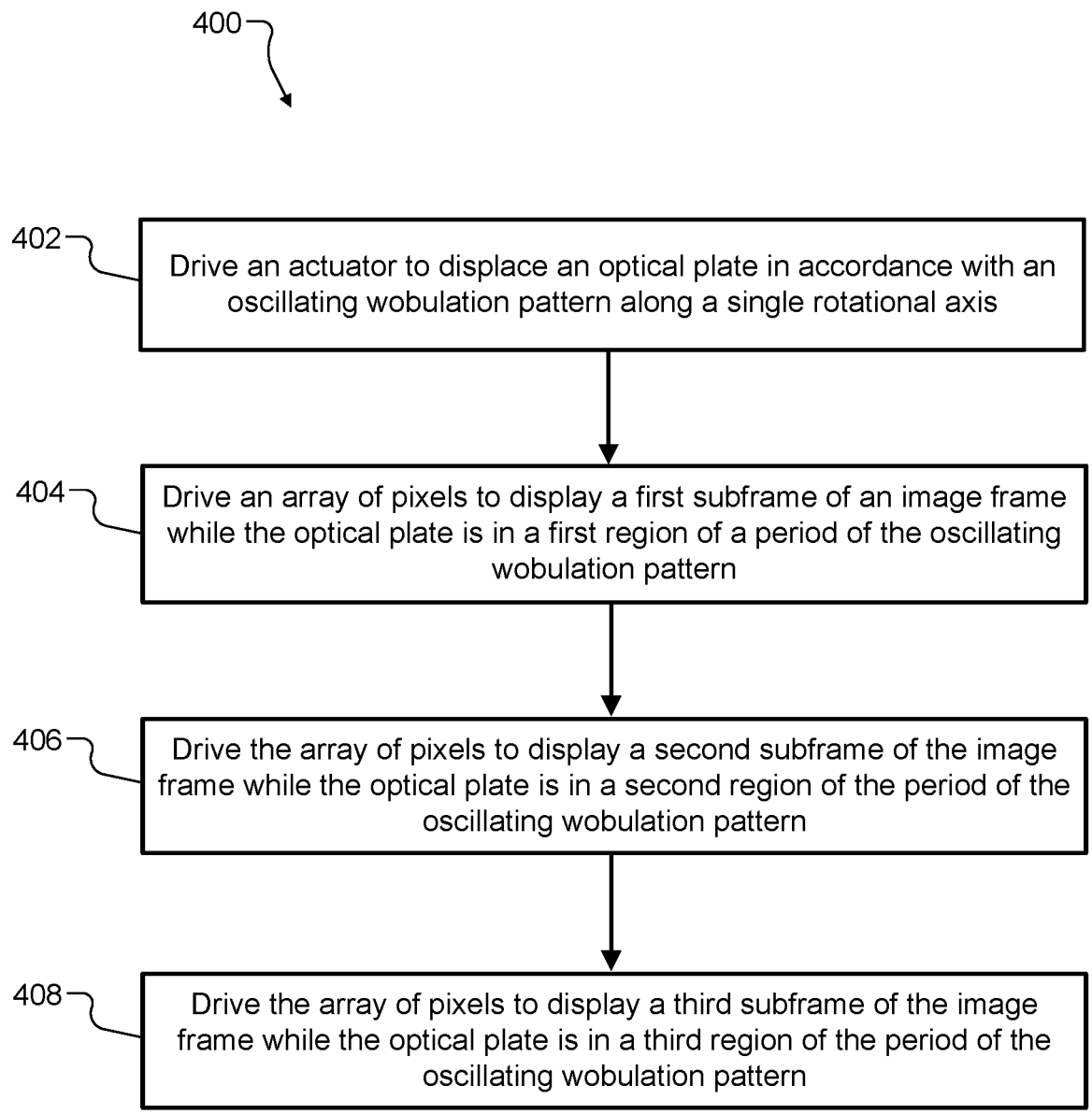

FIGS. 3 and 4 show illustrative methods for performing linear pixel shifting for a non-rectilinear pixel arrangement in accordance with principles described herein. Specifically, FIG. 3 shows a method 300 with operations 302 and 304, while FIG. 4 shows a method 400 with operations 402-408. Methods 300 and 400 show example sequences of operations that may be performed by display system 200 to implement linear pixel shifting for a non-rectilinear pixel arrangement in ways described herein. While FIGS. 3 and 4 show illustrative operations according to a certain implementation, however, it will be understood that other implementations may omit, add to, reorder, and/or modify any of the operations shown in these figures. In some examples, multiple operations shown or described in relation to FIG. 3 or 4 may be performed concurrently (e.g., in parallel) with one another, rather than being performed sequentially as illustrated and/or described. Each of the operations of methods 300 and 400 will now be described in more detail as the operations may be performed by an implementation of display system 200.

At operation 302 of method 300, an implementation of display system 200 may displace an optical plate in accordance with an oscillating wobulation pattern. For example, the displacement may be performed along a single rotational axis (e.g., so as to be linear). The optical plate may be positioned in front of an array of pixels having a non-rectilinear pixel arrangement. Examples of such arrangements and the advantages thereof will be described and illustrated in more detail below.

At operation 304, the display system 200 may drive the array of pixels in connection with the oscillating wobulation pattern. As such, the array of pixels may display a first image while the optical plate is in a first region of a period of the oscillating wobulation pattern. The array of pixels may then display a second image while the optical plate is in a second region of the period of the oscillating wobulation pattern. The array of pixels may then display a third image while the optical plate is in a third region of the period of the oscillating wobulation pattern. Due to the periodic nature of the oscillating wobulation pattern, the various regions may be repeated in rapid succession and the three images displayed during each period may be related to one another in any suitable way. For example, the first, second, and third images may, in one example, be three subframes of a single image frame. As such, the image frame may be perceived as having three times as many pixels as it would have if displayed only on the physical pixels (rather than using the virtual pixels provided by the linear pixel shifting scheme).

For method 400, an implementation of display system 200 may be configured to drive both: 1) an actuator on which an optical plate is mounted so as to be positioned in front of an array of pixels having a non-rectilinear arrangement, and 2) the array of pixels itself. At operation 402, the display system 200 may drive the actuator to displace the optical plate in accordance with an oscillating wobulation pattern along a single rotational axis. At operation 404, the display system 200 may drive the array of pixels to display a first subframe of an image frame while the optical plate is in a first region of a period of the oscillating wobulation pattern. At operation 406, the display system 200 may drive the array of pixels to display a second subframe of the image frame while the optical plate is in a second region of the period of the oscillating wobulation pattern. At operation 408, the display system 200 may drive the array of pixels to display a third subframe of the image frame while the optical plate is in a third region of the period of the oscillating wobulation pattern.

Figure 5:
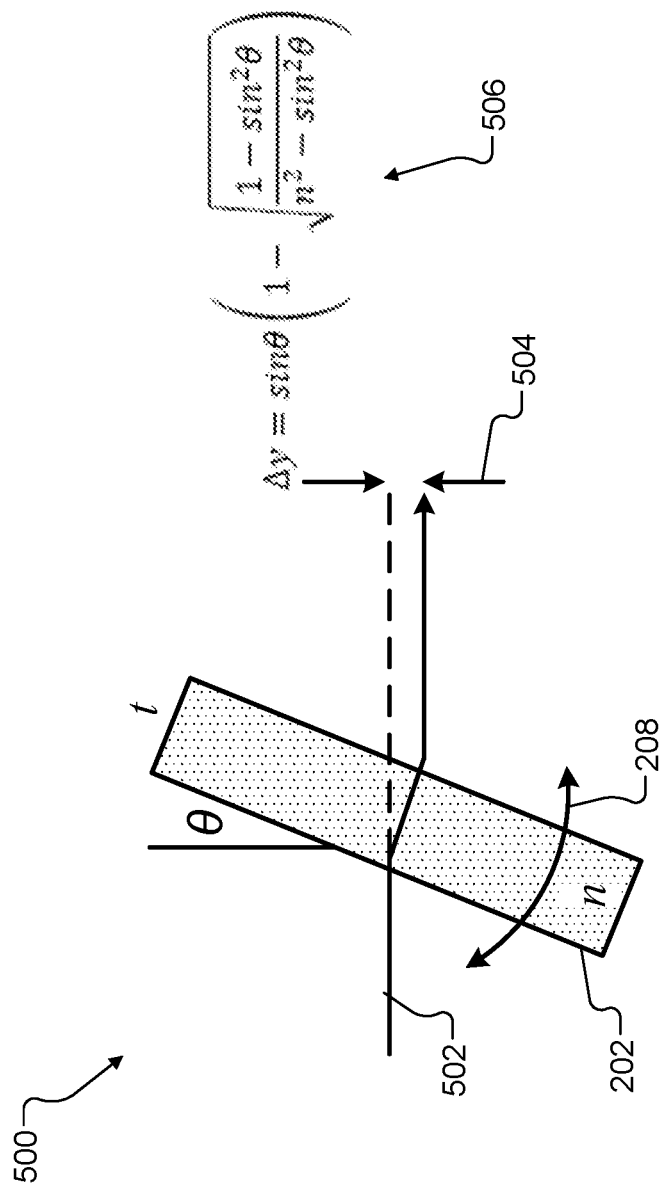
FIG. 5 shows how an illustrative optical plate may be oscillated in accordance with an oscillating wobulation pattern to linearly shift light passing through the optical plate in accordance with principles described herein.

FIG. 5 shows how an illustrative optical plate may be oscillated in accordance with an oscillating wobulation pattern to linearly shift light 502 passing through the optical plate in accordance with principles described herein. In FIG. 5, an implementation of optical plate 202 is shown to be a glass plate configured to allow light from an array of pixels (e.g., pixel array 204, not shown in FIG. 5) to pass through at an angle determined by how far the glass plate is displaced in accordance with an implementation of oscillating wobulation pattern 208. As a result of the displacement of optical plate 202, light 502 is shown to undergo a linear shift 504 (represented by $\Delta y$ in an equation 506 that is shown) of a relatively small amount.

In accordance with equation 506, the linear shift 504 applied to light 502 passing through optical plate 202 may be determined based on several parameters: 1) a plate thickness (t) of optical plate 202, 2) a refractive index (n) of the material from which optical plate 202 is constructed, and 3) an angle (θ) at which optical plate 202 is displaced (e.g., in relation to the direction of light 502, as shown by a dashed-line horizontal axis and a perpendicular vertical axis).

By oscillating the glass plate in a controlled wobulation pattern 208, light 502 may be slightly shifted as it passes through the glass plate in synchronization with different images (e.g., subframes) being presented by the pixel array to create an illusion that there are two or more pixels (i.e., virtual pixels) for every one physical pixel. For an oscillating wobulation pattern that includes three regions per period such as various oscillating wobulation patterns described herein, there would be three virtual pixels produced for every physical pixel.

To make use of the additional resolution provided by the pixel shifting scheme, different subframes may be generated from a single image frame. The image frame may then be presented by effectively overlaying the subframes (e.g., by rapidly switching between them) by way of the oscillating optical plate. In this way, an illusion is created that there are at least twice as many pixels (referred to as virtual pixels) as there are physical pixels on the panel. Essentially, since the glass plate has two parallel planes, light projected through the plate as the plate wobbles allows all the pixels to be projected in one location and then to shift (e.g., along a linear projection channel) to another location (e.g., a location that is slightly down and over, etc.). As the glass plate is moving in this way, the pixel panel may be driven so as to display the various subframes during different regions of each period of the oscillating wobulation pattern. An oscillation of this kind (e.g., back and forth between the two different locations and with the two different subframes) may create the illusion that there are two overlaid pixel panels each having the density of the physical pixel panel. Since the glass plate has two parallel surfaces, whatever angles of light are entering will be the same angles of light that exit, but a lateral shift is induced such that, for a fixed array of pixels with this plate in front of it, every pixel moves with the angle of the plate due to refraction through the plate.

Figure 6:
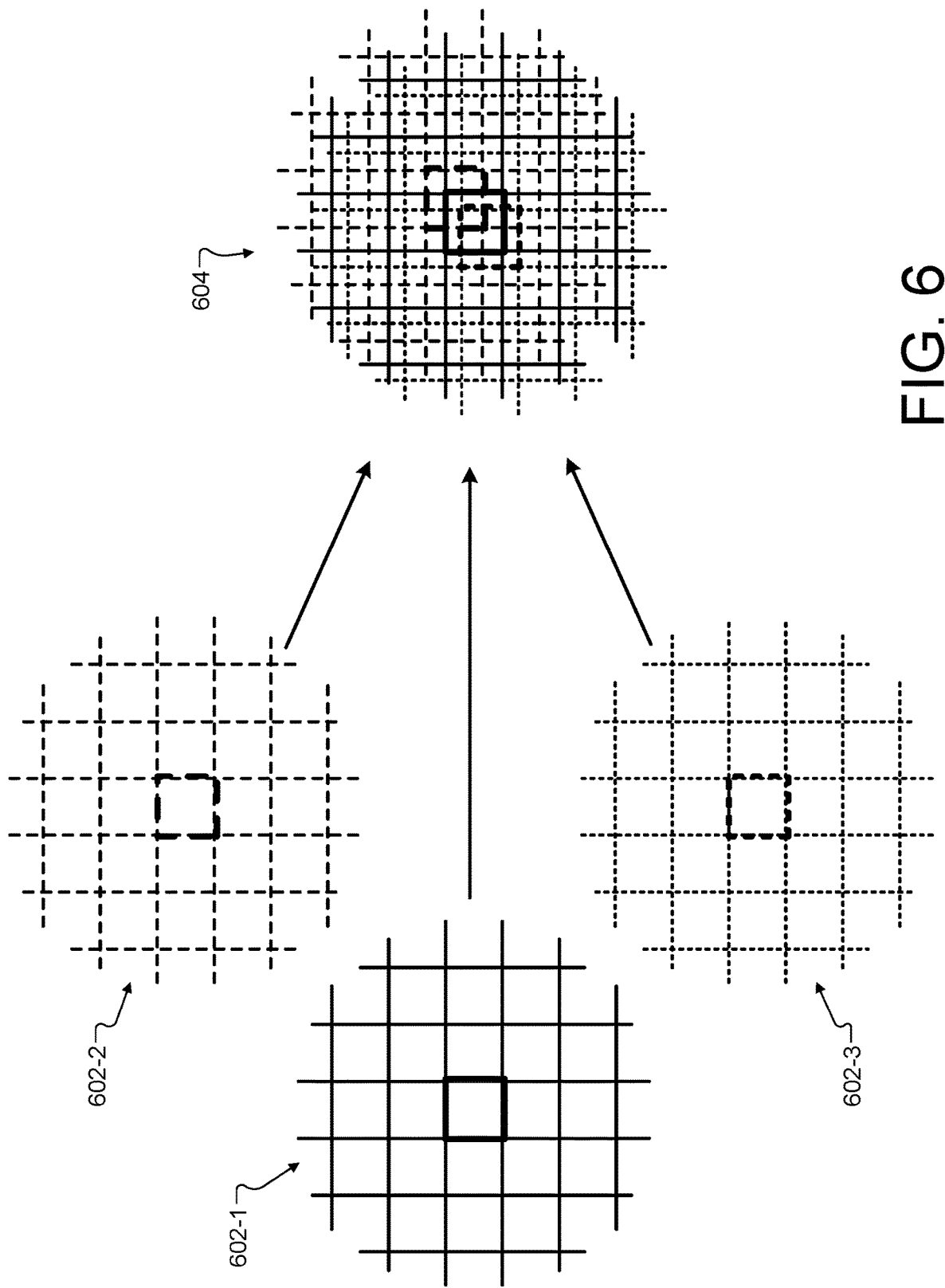
FIG. 6 shows how an illustrative image frame may be presented by superimposing a plurality of subframes of the image frame using linear pixel shifting in accordance with principles described herein.

To further illustrate these principles in relation to a rectilinear pixel arrangement, FIG. 6 shows how an illustrative image frame may be presented by superimposing a plurality of subframes 602 of the image frame (i.e., a subframe 602-1, a subframe 602-2, and a subframe 602-3) using linear pixel shifting in accordance with principles described herein. As shown, each of the subframes 602 are depicted using different line styles to help differentiate between the subframes as they are overlaid onto one another to show a full-resolution view of an image frame 604 that, in this example, includes three times the pixel resolution as the physical pixel panel has. One particular virtual pixel is bolded in each subframe 602 to further help illustrate how overlapping virtual pixels may be provided in the image frame 604 to give the illusion that there is more resolution and higher pixel density than what the physical pixel panel actually provides without the linear pixel shifting scheme.

In this example, the virtual pixels (represented as squares) are shown to be rectilinear (all the same size and shape in a grid) and to be immediately adjacent to one another such that there are no gaps between the pixels. Rapidly switching between the three subframes 602 shown in the figure as these subframes 602 are superimposed by the pixel shifting process provides an illusion to a human viewer that all three subframes are being presented simultaneously and that there are three times as many pixels (at three times the density and one third the pitch) as actually exist.

It will be understood that similar implementations of pixel shifting may also be applied to other types of pixel panels, including pixel panels with gaps between pixels. For example, rather than overlapping (or at least overlapping to such a full extent), pixels may be shifted into gaps between pixels that would not otherwise include pixels. Certain types of pixel panels (e.g., certain micro-LED pixel panels) may be produced with these types of gaps between physical pixels and pixel shifting schemes such as described herein may provide an efficient and effective way to fill those gaps with additional virtual pixels (e.g., in the event that manufacturing processes do not otherwise allow for physical pixels to fill in the gaps, at least not with unwanted costs, power usage, and so forth).

Pixel shifting shown in the example of FIG. 6 (and other examples described and illustrated herein) is referred to as linear pixel shifting since oscillating wobulation patterns in these examples cause optical plates to be displaced only with respect to a single rotational axis. Certain benefits may arise from limiting the movement of the optical plate to a single rotational axis in this way. For example, the design complexity and reliability of the circuit may be considerably less when there is only one actuator wobbling a plate on only one axis than when other dimensions are involved. Nevertheless, it will be understood that non-linear or multidimensional wobulation patterns involving more than one rotational axis may be used in certain pixel shifting schemes. For example, if an optical plate is configured to oscillate with respect to both an x-axis and a y-axis (or if two optical plates are configured to wobble on these two respective axes), additional gaps of a rectilinear pixel arrangement (e.g., gaps along the x-axis, along the y-axis, and along diagonals, etc.) may be filled in.

In one implementation, for instance, a first subframe could be presented on the pixel array when the pixels are projected to a first location (e.g., when the glass plate is at 0° in both the vertical and horizontal dimensions, such that light from the physical pixels passes straight through). A second subframe may be presented on the pixel array when the pixels are projected to gaps right below the pixels (e.g., when the glass plate is fully displaced along the vertical dimension and is still at 0° in the horizontal dimension, such that the light is shifted down). A third subframe may be presented on the pixel array when the pixels are projected to gaps below and to the right of the pixels (e.g., when the glass plate is fully displaced along both the horizontal and the vertical dimensions, such that the light is shifted down and to the right). A fourth subframe may then be presented on the pixel array when the pixels are projected to gaps directly to the right of the pixels (e.g., when the glass plate is fully displaced along the horizontal dimension and is still at 0° in the vertical dimension, such that the light is shifted over to the right). The type of pixel shifting scheme would achieve an effective four-fold increase in the apparent resolution and pixel density of this panel by filling in all the gaps between the pixels. However, this achievement comes with the complexity of a non-linear oscillation pattern for a single optical plate (or coordinated linear patterns for multiple plates), which may introduce added complexity, power, cost, potential points of failure, etc., to the design. In any event, this type of non-linear oscillating wobulation pattern assumes a particular rectilinear pixel arrangement with gaps between the pixels, which is not how all pixel panels are arranged.

Figure 7:
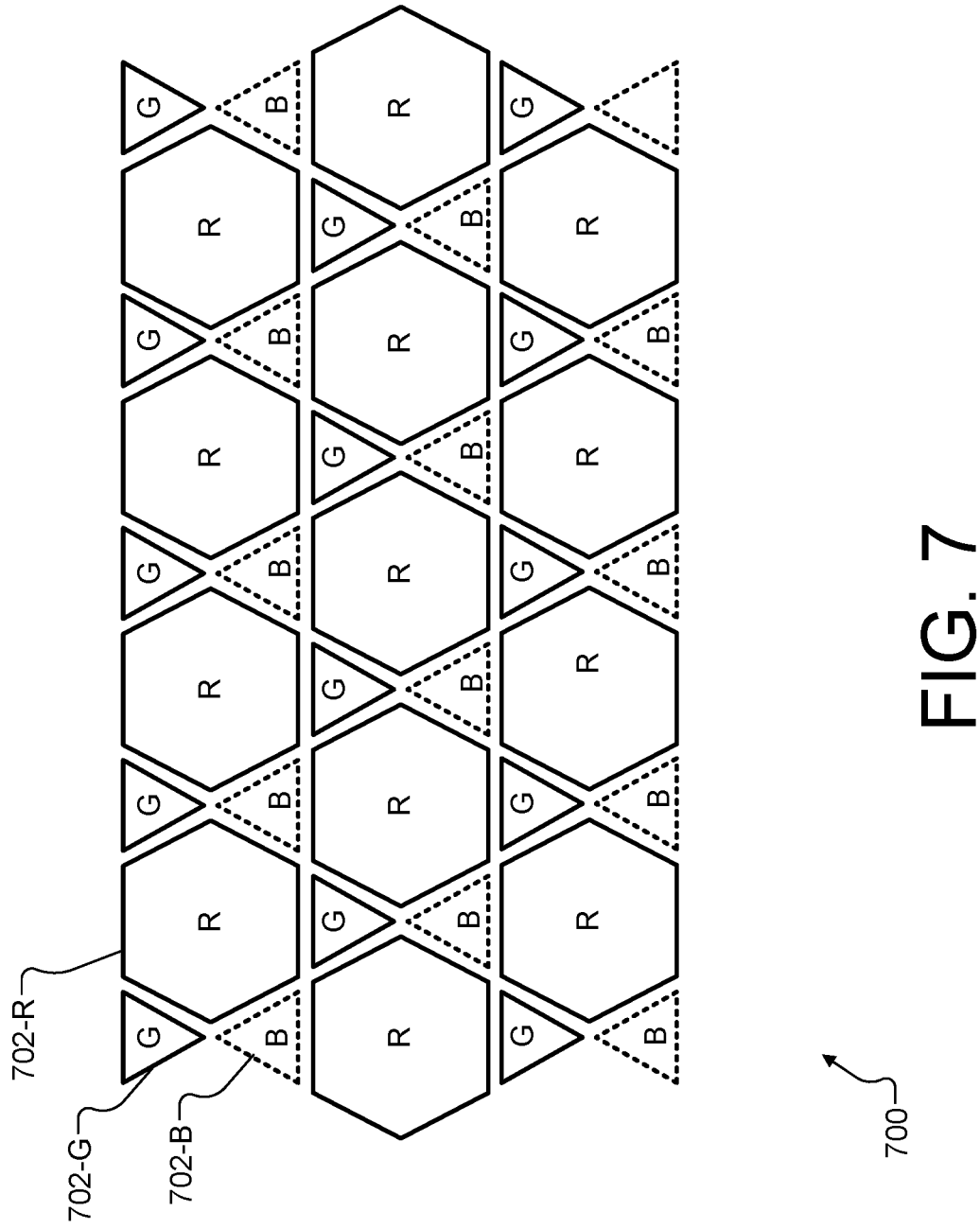
FIG. 7 shows aspects of an illustrative non-rectilinear pixel arrangement in accordance with principles described herein.

For example, FIG. 7 illustrates a more complex pixel arrangement that may not be amenable to pixel shifting patterns described above as relying on rectilinear pixel arrangements. Specifically, FIG. 7 shows aspects of an example non-rectilinear pixel arrangement in accordance with principles described herein.

In the examples illustrated above, pixel shifting has been shown and described as being applied to arrays of pixels in different types of rectilinear pixel arrangements. As used herein, rectilinear pixel arrangements are those in which each of the pixels are the same size and shape as one another (e.g., uniformly-sized squares such as illustrated in the examples above). Rectilinear displays may include gaps between pixels (as has been mentioned), or may include a rotation (e.g., 450 rotation to turn the square shapes into diamond shapes) and/or other such variations. Pixel shifting such as has been illustrated and described above may be applied to any of these types of rectilinear pixel arrangements to achieve increases in pixel density and resolution along one or more dimensions (e.g., the horizontal and/or vertical dimensions, a diagonal dimension, etc.), as has been described.

While rectilinear pixel arrangements have been the most common type of pixel arrangements conventionally, a variety of benefits are being discovered and developed with emerging display technologies that are not constrained to these arrangements. For example, micro-LED display technologies support non-rectilinear pixel arrangements from which a variety of advantages may arise. To illustrate, FIG. 7 shows one example of a non-rectilinear pixel arrangement 700 that may be used for an array of pixels on a pixel panel (e.g., a micro-LED pixel panel).

A pixel panel with pixels arranged such as shown in FIG. 7 may be referred to as a non-rectilinear pixel panel (due to the non-rectilinear arrangement of the pixels) or an offset pixel panel (due to the offset between like-colored pixels illustrated in the figure). As shown in FIG. 7, non-rectilinear pixel arrangement 700 may include a variety of pixels 702, including red pixels 702-R, green pixels 702-G, and blue pixels 702-B. While only one pixel of each color is explicitly labeled with its reference designator (702-X) in FIG. 7, each red pixel 702-R is labeled with an 'R', each green pixel 702-G is labeled with a 'G', and each blue pixel 702-B is labeled with a 'B'.

As illustrated by the example of non-rectilinear pixel arrangement 700, pixels 702 may be packed together (e.g., with or without intervening gaps) in a similar manner as pixels of a traditional rectilinear panel might be. However, as shown, the sizes and shapes of the pixels in a non-rectilinear pixel arrangement such as arrangement 700 may be different (i.e., non-uniform) for each color. Hence, as shown, non-rectilinear arrangement 700 includes pixels with non-uniform sizes and non-uniform shapes. More particularly, the pixel array is shown to include red pixels 702-R that are of a first size, blue pixels 702-B that are of a second size, and green pixels 702-G that are also of the second size (though in this example, the green pixels are flipped as compared to the blue pixels). The first size (of the red pixels) is shown to be considerably larger than the second size (of the blue and green pixels) in this example. This may be advantageous for pixel panels in which materials and semiconductor fabrication processes for the red pixels result in less efficient red pixels, such that the red pixels would appear to be dimmer than their green and blue counterparts. While some pixel panels may account for this issue by having two or more red pixels for every green and blue pixel, non-rectilinear arrangement 700 shows that another way to address the issue and emphasize the relatively inefficient red pixels over the more efficient green and blue pixels may be to make red pixels 702-R physically larger than green pixels 702-G and blue pixels 702-B.

Additionally, along with the non-uniform sizes of the various pixels 702 in non-rectilinear pixel arrangement 700, non-uniform shapes between the different colors may allow for an advantageous, compact geometry in which the pixels can be tightly packed together (with minimal or no gaps between pixels), as shown. As depicted in FIG. 7, non-rectilinear arrangement 700 includes red pixels 702-R that are of a hexagonal shape, blue pixels 702-B that are of a triangular shape (e.g., an equilateral triangle having a first orientation), and green pixels 702-G that are also of the triangular shape (though, in this example, having a second orientation that is flipped from the first orientation so as to create the compact geometry shown).

For the same reasons that have been described and illustrated above in relation to rectilinear pixel arrangements, non-rectilinear pixel arrangements may benefit from the application of pixel shifting. New complications may arise, however, when introducing pixel shifting to this type of arrangement. For example, pixel shifting in two or four positions may produce non-uniform pixel density in which, for a given color, horizontal and/or vertical pixel densities will vary. To illustrate, FIGS. 8A-8B shows aspects of an illustrative non-uniformity issue and how it can be overcome by performing linear pixel shifting for a non-rectilinear pixel arrangement in accordance with principles described herein.

Figure 8A:
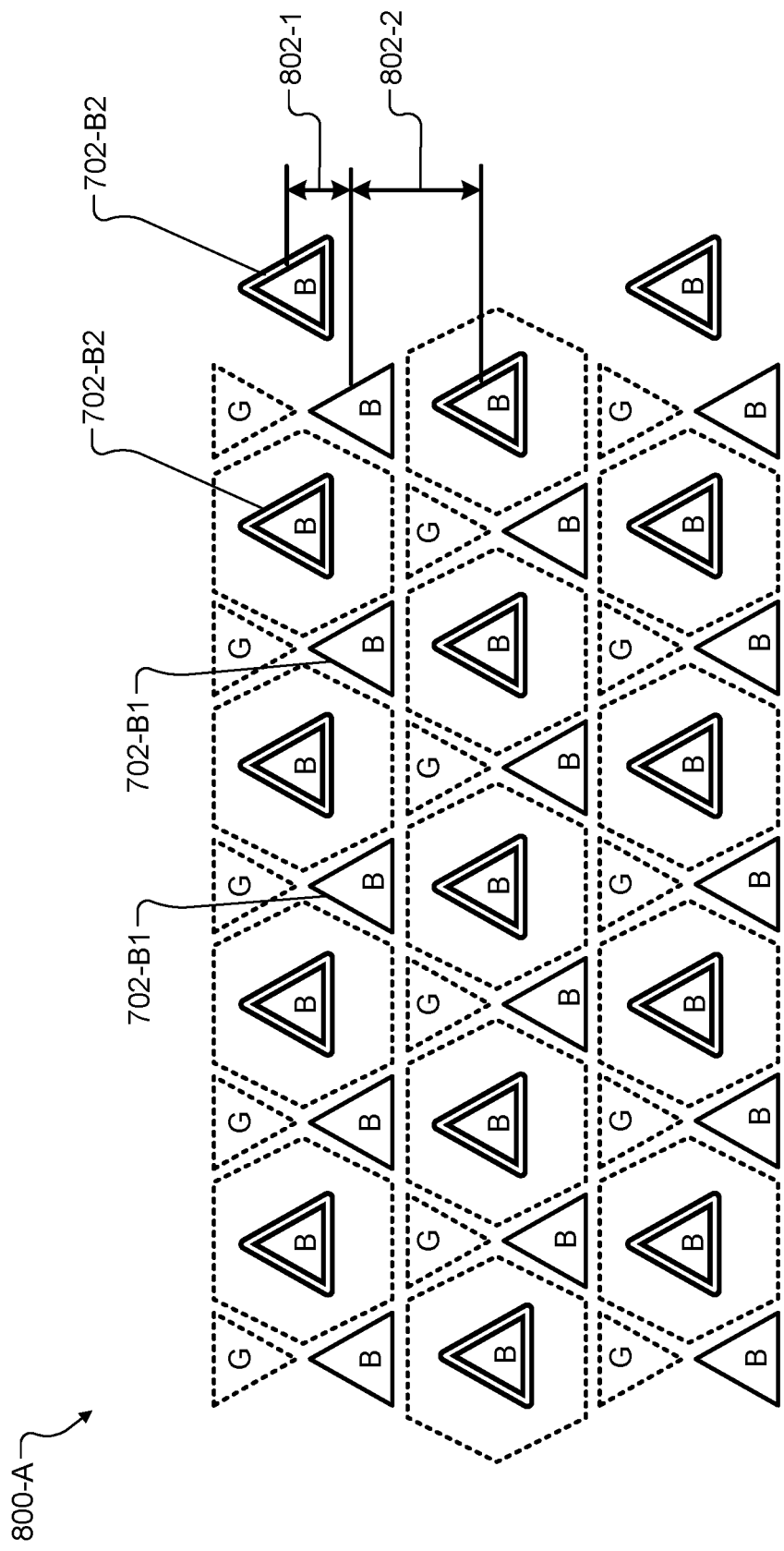
FIGS. 8A-8B shows aspects of an illustrative non-uniformity issue and how it can be overcome by performing linear pixel shifting for a non-rectilinear pixel arrangement in accordance with principles described herein.

First, FIG. 8A shows aspects of a two-position pixel shifting scheme 800-A involving the same non-rectilinear pixel arrangement 700 described and illustrated above. Since the figure would be highly cluttered if red, green, and blue virtual pixels were all shown in the two positions, only blue pixels 702-B are shown in both positions, while red pixels 702-R and green pixels 702-G are outlined (using dotted lines) in a single position for reference. As shown, a first set of virtual blue pixels 702-B1(drawn with singular lines) may be produced when an optical plate is in a first region of a period of an oscillating wobulation pattern, while a second set of virtual blue pixels 702-B2 (drawn with double lines) may be produced when the optical plate is in a second region of the period. Accordingly, the blue pixels 702-B of non-rectilinear pixel arrangement 700 are shown to be the basis of two sets of virtual blue pixels 702-B1 and 702-B2 when a linear pixel shift along a diagonal projection channel (e.g., up and to the right) is applied. While only the blue pixels are illustrated as shifting for the sake of illustrative clarity, it will be understood that, as the optical plate wobbles, the entire array of pixels 702 (including the red pixels 702-R, green pixels 702-G, and blue pixels 702-B) will shift together in the same way as explicitly illustrated by virtual blue pixels in FIG. 8A.

Similarly as other examples described above, a first subframe associated with virtual blue pixels 702-B1 (represented by the singular lines) may be presented on the array of pixels when the optical plate is in one position, while a second subframe associated with virtual blue pixels 702-B2 (represented by the double lines) may be presented on the array of pixels when the optical plate is displaced to another position (offset up and to the right, as shown). While the offset between these two positions may allow for pixel uniformity in the horizontal dimension (along the x-axis), however, the figure shows that this offset does not provide such uniformity in the vertical dimension (along the y-axis). Specifically, due to the nature of the geometry of this particular non-rectilinear pixel arrangement, a vertical offset 802-1 between a pixel and its nearest neighbor above is shown to be different from a vertical offset 802-2 between the pixel and its nearest neighbor below (such that offset 802-1 is not equal to offset 802-2, as shown). Accordingly, two-position pixel shifting scheme 800-A may double the resolution and density of the panel, but at the expense of introducing this vertical non-uniformity between like-colored pixels (an effect that may create certain undesirable artifacts in the display as perceived by the user).

Figure 8B:
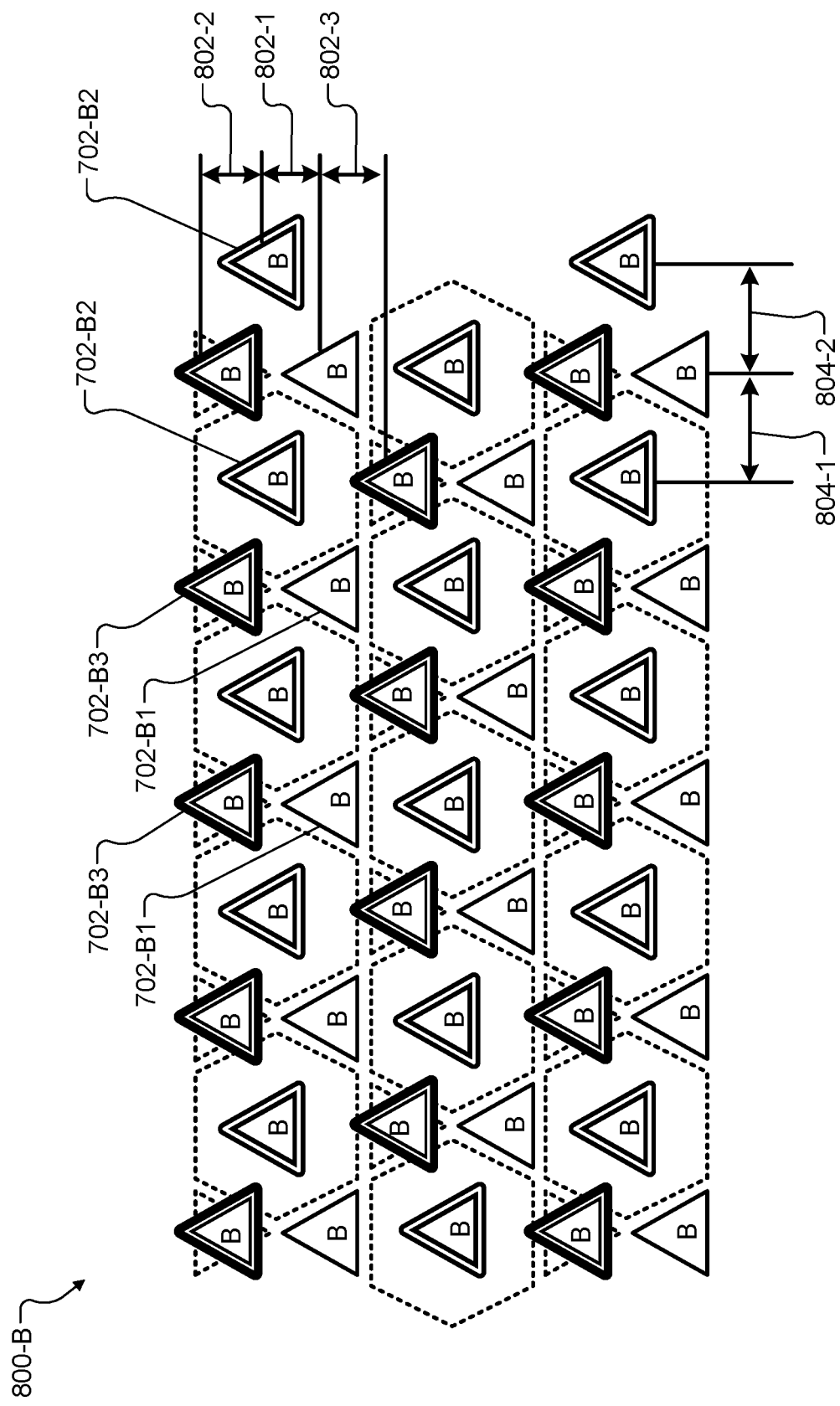

To rectify this non-uniformity issue, FIG. 8B shows an illustrative three-position linear pixel shifting scheme 800-B that may be applied to non-rectilinear pixel arrangement 700 so as to resolve or mitigate the non-uniformity issue (i.e., to result in two-dimensional uniform pixel distributions across three subframes). The notation used in FIG. 8B is similar to other examples above, but a third set of virtual blue pixels 702-B3 (drawn using a different double line style) is shown to be presented at a third position that will be understood to be associated with a third subframe. As shown, the example of linear pixel shifting scheme 800-B provides spatial uniformity between like-colored pixels not only along the horizontal dimension, but also along the vertical dimension. More particularly, a vertical offset 802-1 (between a pixel and its nearest neighbor above), a vertical offset 802-2 (between the above neighbor and the next neighbor above that), and a vertical offset 802-3 (between the pixel and its nearest neighbor below) may all be equal offsets (thereby eliminating the vertical non-uniformity of two-position pixel shifting scheme 800-A). At the same time, a horizontal offset 804-1 (between a pixel and its nearest lateral neighbor to the left) and a horizontal offset 804-2 (between the pixel and its nearest lateral neighbor to the right) are also shown to be equal offsets, such that linear pixel shifting scheme 800-B still enjoys horizontal uniformity.

Accordingly, three-position linear pixel shifting scheme 800-B may triple the resolution and density of the panel without introducing any non-uniformity between like-colored pixels. At the same time, this pixel shifting scheme is still linear, such that it may be implemented by a single optical plate that is oscillated along a single rotational axis (to move the pixels to the three linear positions). As has been mentioned, various complexities may be avoided by keeping the pixel shifting to a single rotational axis, rather than using multiple axes (e.g., to displace the pixel array in a triangular motion or the like).

A variety of oscillating wobulation patterns may be used to implement the three-position linear pixel shifting described and illustrated with respect to FIG. 8B. In selecting a particular oscillating wobulation pattern for a given implementation, a number of factors may be considered. One consideration that may be accounted for in the design or selection of an oscillating wobulation pattern is its performance (e.g., effectiveness, power efficiency, the display uniformity it facilitates, etc.). For example, certain oscillating wobulation patterns may naturally provide a high degree of performance in which a period of the oscillating wobulation pattern is easily and accurately divided into three regions that are each associated with equal portions of time within the period and that are associated with equal projection channel widths in the projection space (i.e., the physical distance that a projected pixel associated with one subframe is moved before it is changed for the next subframe). Other oscillating wobulation patterns, on the other hand, may not provide such performance so readily (as will be described). Another factor that may be considered is how much complexity a given oscillating wobulation pattern introduces into the system design. For example, it may be relatively straightforward for an actuator controller to drive a mounted optical plate in certain oscillating wobulation patterns and more difficult to drive the optical plate in other oscillating wobulation patterns. Yet another factor that may be considered is the acoustic noise generated by a given oscillating wobulation pattern. Any time an actuator is rapidly moving an object (such as an oscillating optical plate), some amount of acoustic noise will be generated. The amount and nature of this noise may therefore be an important consideration, particularly when a display panel is to be implemented in a device that is worn on a user's head (e.g., a head-mounted display of an extended reality presentation device).

Figure 9:
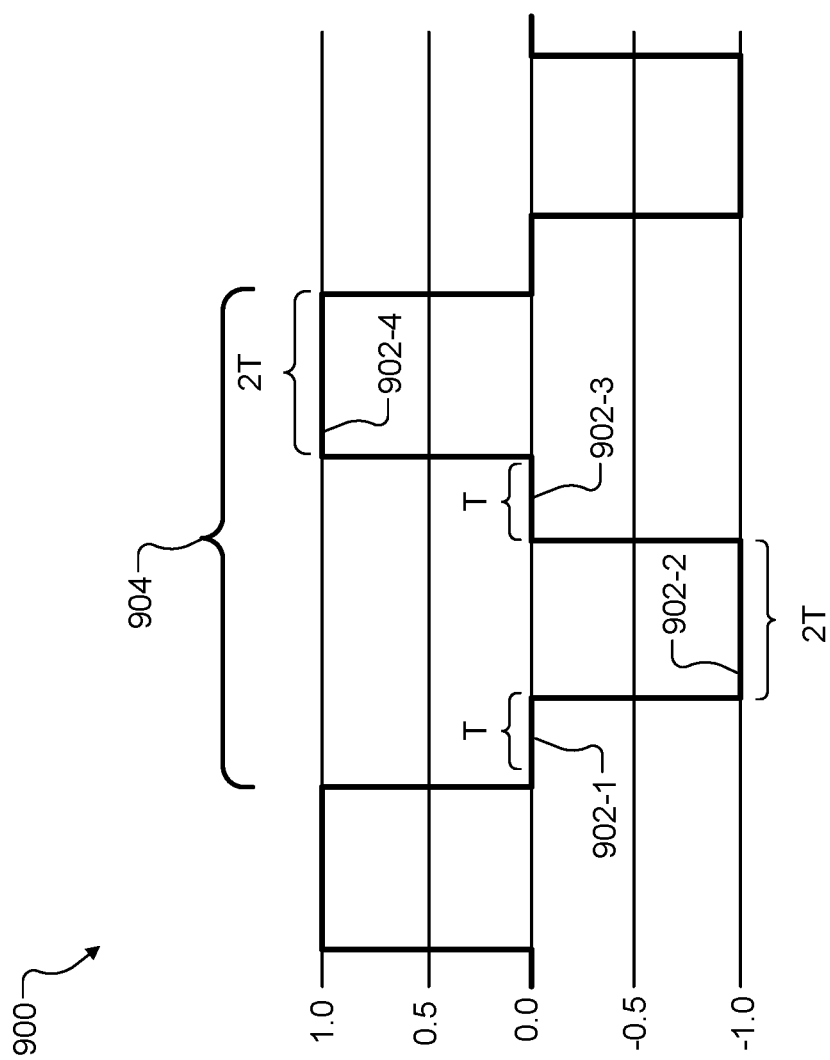
FIGS. 9-11 show illustrative aspects of various oscillating wobulation patterns that may be used to perform linear pixel shifting for a non-rectilinear pixel arrangement in accordance with principles described herein.
Figure 10:
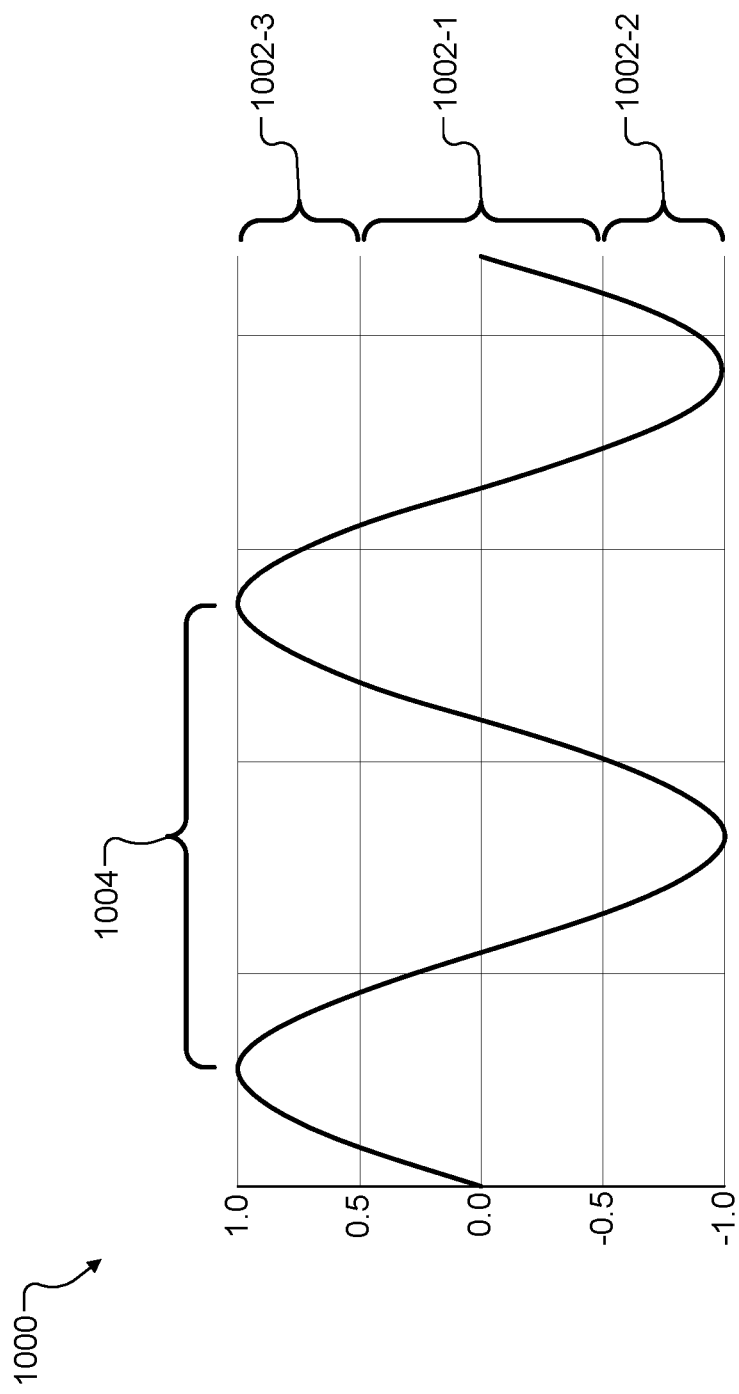
Figure 11:
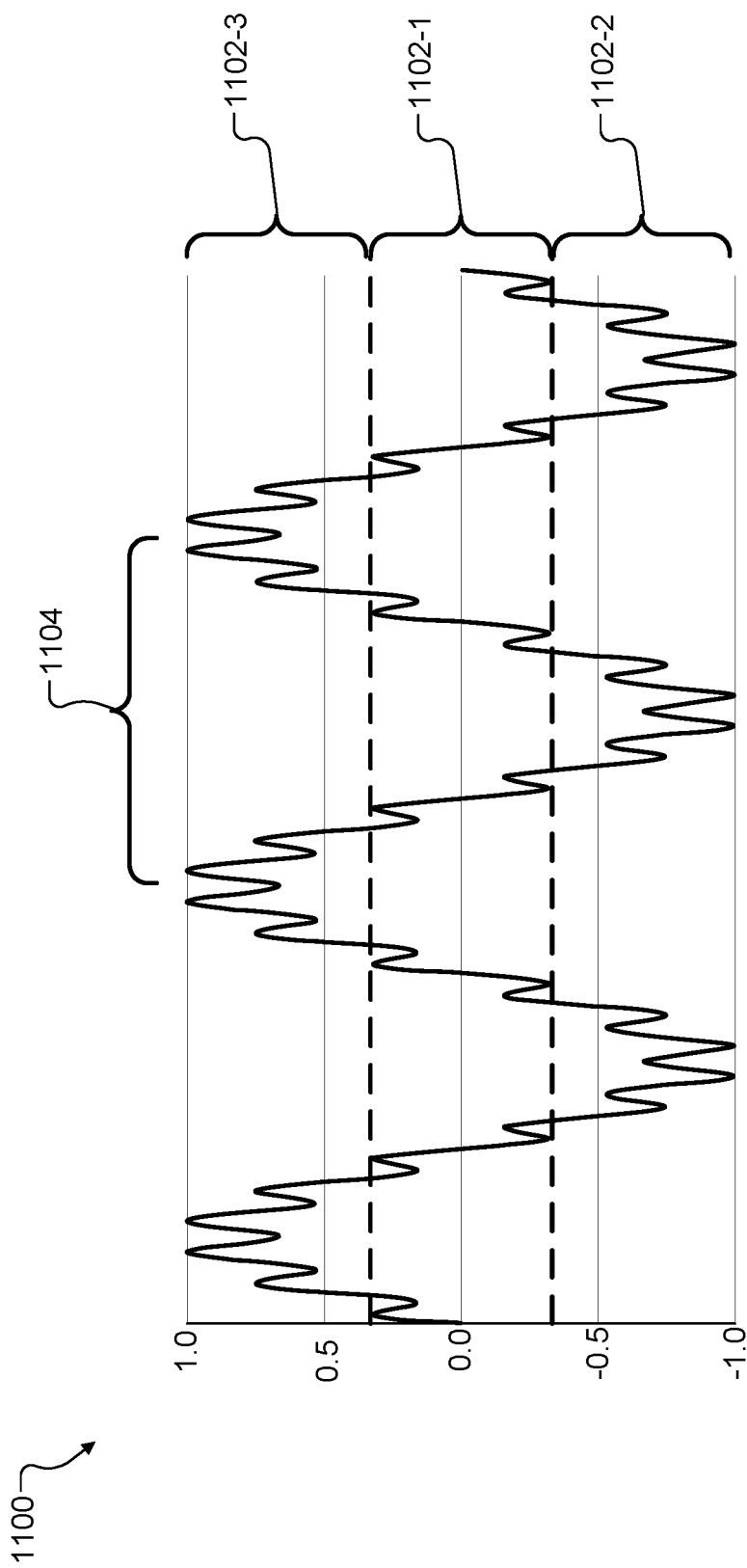

FIGS. 9-11 show illustrative aspects of a few possible oscillating wobulation patterns that may be used to perform linear pixel shifting for a non-rectilinear pixel arrangement in accordance with principles described herein. Additionally, certain advantages and/or disadvantages with each oscillating wobulation pattern will also be described. It will be understood that any of these or other suitable oscillating wobulation patterns could be used in a given implementation to produce three-position linear pixel shifting for a non-rectilinear pixel arrangement (such as illustrated by linear pixel shifting scheme 800-B). In each of the following illustrations, it will be understood that the waveform represents a displacement of the optical plate from 1.0 (i.e., fully displaced or deflected in one direction) to −1.0 (i.e., fully displaced or deflected in the opposite direction) with time extending along the horizontal axis (the x-axis). It will be understood that 0.0 may represent a displacement between 1.0 and −1.0, such as a neutral position of the glass that allows light to pass straight through without being shifted or offset.

For each of the oscillating wobulation pattern examples described and illustrated below, it will be understood that the oscillating wobulation pattern may be applied by driving any of the actuators described herein according to the pattern while any of the optical plates described herein are properly mounted to the actuator. While the speed of the wobulation applied in this way may vary from implementation to implementation (e.g., with a wobulation frequency in the range of kilohertz being one example of a suitable frequency), it will be understood that the frequency at which the optical plate is being wobbled may be on a significantly longer timescale than the timescale on which the array of pixels is driven. Accordingly, it will be assumed in the following description that the array of pixels may switch virtually instantaneously from presenting one image (e.g., one subframe of an image frame) to another image, even though it will be understood such a switch would actually take a finite amount of time. In some examples, a period of the oscillating wobulation pattern may correspond to a single frame time, such that three subframes of a given image frame are shown only once or twice during the period. In other examples, the period of the oscillating wobulation pattern may correspond to only a fraction of the frame time, such that each of the three subframes would be shown many times during the period.

As a first example oscillating wobulation pattern, FIG. 9 shows a stepped pattern 900 characterized by a step function having a periodic sequence of: 1) a first segment 902-1 with an intermediate value (0.0) for one time unit (T), 2) a second segment 902-2 with a minimum value (−1.0) for two time units (2T), 3) a third segment 902-3 with the intermediate value (0.0) for one more time unit (T), and 4) a fourth segment 902-4 with a maximum value (1.0) for two time units (2T). As shown, segments 902 (i.e., the four segments 902-1 through 902-4) represent one period 904 of stepped pattern 900 and will be understood to periodically repeat (e.g., segment 902-4 is shown to be followed by a new first segment with the intermediate value (0.0)).

As shown in FIG. 9, the four segments 902-1 through 902-4 are designed to be conveniently divisible into three regions of equal time per period. For example, a first subframe may be associated with the region corresponding to the intermediate value (0.0), such that the first subframe is displayed during both segment 902-1 and segment 902-3. A second subframe may be associated with the region corresponding to the minimum value (−1.0), such that the second subframe is displayed during segment 902-2. A third subframe may be associated with the region corresponding to the maximum value (1.0), such that the third subframe is displayed during segment 902-4. In this way, each of the three subframes may be displayed for an equal amount of time (associated with their respective regions) during each period 904 of stepped pattern 900. This amount of time is equal to two time units T (i.e., 2T).

Because only three discrete values are used in the oscillating wobulation pattern of stepped pattern 900 (i.e., −1.0, 0.0, and −1.0, corresponding to three discrete positions for the optical plate), the projection channel widths for each pixel are equal in this example (i.e., each has a width of zero since it constitutes a single point in the projection space). This example oscillating wobulation pattern is therefore conceptually simple and provides a high degree of performance in terms of uniformity and effectiveness. Unfortunately, however, perfectly square edges of a stepwise function such as shown in FIG. 9 are not possible to perfectly implement in real-world systems, at least because there will always be at least some travel time between displacement positions, some settling time for the physical plate, and so forth. Even approximating this type of stepped pattern may be difficult and costly in terms of power efficiency, acoustic noise, design complexity, and so forth. Accordingly, to avoid these drawbacks for implementations in which power usage, acoustic noise, and/or actuator design simplicity are important considerations, other more natural types of oscillating wobulation patterns may also be worthy of consideration.

FIG. 10 shows an example of such a natural pattern. Specifically, as shown, FIG. 10 illustrates an oscillating wobulation pattern implemented as a monotone sinusoidal pattern 1000 characterized by a sinusoidal function. In this example, three regions 1002, including an intermediate region 1002-1, a lower region 1002-2, and an upper region 1002-3, may represent the different regions of the pattern in which three different subframes may be presented as the optical plate oscillates. A period 1004 of monotone sinusoidal pattern 1000 (analogous to period 904 described above) is shown to include part of each region 1002 and to be repeatable as the sinusoidal function continues.

In this example, intermediate region 1002-1, lower region 1002-2, and upper region 1002-3 are each associated with equal portions of time within the period. Even if the optical plate spends the same amount of time in each of these three regions, however, the figure shows that the intermediate region 1002-1 is twice the width of lower region 1002-2 and of upper region 1002-3 (or, in other words, region 1002-1 is the width of both regions 1002-2 and 1002-3 combined). Consequently, intermediate region 1002-1 of monotone sinusoidal pattern 1000 may be associated with a wider projection channel than lower region 1002-2 or upper region 1002-3, and, to compensate, the driving of the array of pixels in connection with this oscillating wobulation pattern may include driving the array of pixels to display (based on the wider projection channel) the first image (e.g., the first subframe) with a different brightness level than is used to display the second image or the third image (e.g., the second or third subframes). In other words, as the optical plate oscillates and the projected array of pixels moves from side to side, each subframe may be projected for an equal amount of time but one of the subframes will move across a larger segment of the projection space than the others, creating an undesirable degree of non-uniformity unless compensated for in some way.

Various approaches may be used to compensate for or mitigate this projection width non-uniformity issue. For example, the brightness of different subframes may be altered by the pixel driver controller so as to present the first subframe and the second and third subframes with different brightness levels (thereby tricking the human eye into perceiving that the subframes are more uniform than they actually are). Another possibility is to force the widths of the projection channels to be equal (narrowing the first region and broadening the second and third regions accordingly), though this would create a new problem to be compensated for in some way, since the regions would now be associated with unequal portions of time. One way or another, a pure (monotone) sinusoid such as illustrated for monotone sinusoidal pattern 1000 will generate at least some non-uniformity (in either time or projection width) regardless of how the regions are divided up. Brightness or other compensation for this non-uniformity may therefore be considered for oscillating wobulation pattern implementations of this type.

A monotone sinusoidal pattern characterized by a pure sinusoidal function such as monotone sinusoidal pattern 1000 may be advantageous in terms of oscillation complexity (e.g., it may be straightforward to configure the actuator to oscillate in accordance with this natural pattern), power, acoustic noise, and possibly other factors. At the same time, however, this monotone sinusoidal pattern may disadvantageously introduce the non-uniformity of time and/or width of the inner region (the first region in the figure) as compared to the outer regions (the second and third regions in the figure). This non-uniformity may affect the performance provided by this oscillating wobulation pattern (making it less effective, etc.) and/or may add complexity to the design of the pixel driver controller as brightness values are manipulated in an effort to compensate for the inherent non-uniformity that has been introduced.

To address disadvantages of both of the previous example oscillating wobulation patterns while introducing only a slightly more complex waveform, yet another example oscillating wobulation pattern is shown in FIG. 11. This oscillating wobulation pattern is a multitone sinusoidal pattern 1100 characterized by a composite sinusoidal function including a sinusoid and a harmonic of the sinusoid.

As shown, by adding a higher-frequency harmonic to the monotone sinusoid, an intermediate region 1102-1, a lower region 1102, and an upper region 1102-3 are made to be associated with equal portions of time within a period 1104, as well as to be associated with equal projection channel widths (as emphasized by the dashed lines at approximately 0.3 and −0.3, thereby dividing the range into three equal parts). The harmonic added to the monotone sinusoid pattern to thereby make it a multitone sinusoid pattern may be any suitable harmonic as may serve a particular implementation. For example, a ninth harmonic, an eleventh harmonic, another suitable higher-level harmonic, and/or a combination of two or more of these harmonics may be used. As mentioned above, the result of using this type of oscillating wobulation pattern is that the actuator design simplicity, high power efficiency, good acoustic performance, and other benefits associated with natural waveforms may be achieved (similar to the monotone sinusoidal pattern described above), while the high uniformity of projection time and width between the three regions and the benefits it provides may also be achieved (similar to the stepped pattern described above). Hence, a multitone sinusoidal pattern such as multitone sinusoidal pattern 1100 may effectively balance many of the design considerations that have been described, making for a good compromise in an implementation in which many or all of these factors are considered relatively important.

While the waveforms in the figures above are illustrated as relatively simple shapes, it will be understood that in practice there may be modifications to the waveforms due to constraints such as drive electronics, dynamic response, noise, vibrations, and so forth. Various design modifications to address these and other constraints (e.g., to reduce noise or vibration at a certain frequency, to reduce power for a small tradeoff in performance, etc.) may thus be made to a particular implementation in the spirit of the principles described above.

The following examples describe methods and systems implementing linear pixel shifting for a non-rectilinear pixel arrangement:

1. A method comprising: displacing an optical plate in accordance with an oscillating wobulation pattern along a single rotational axis, the optical plate being positioned in front of an array of pixels having a non-rectilinear pixel arrangement; and driving the array of pixels in connection with the oscillating wobulation pattern such that: the array of pixels displays a first image while the optical plate is in a first region of a period of the oscillating wobulation pattern, the array of pixels displays a second image while the optical plate is in a second region of the period of the oscillating wobulation pattern, and the array of pixels displays a third image while the optical plate is in a third region of the period of the oscillating wobulation pattern.
2. The method of any of the preceding examples, wherein the oscillating wobulation pattern is a monotone sinusoidal pattern characterized by a sinusoidal function.
3. The method of any of the preceding examples, wherein: the first region, the second region, and the third region are associated with equal portions of time within the period; the first region is associated with a wider projection channel than the second region or the third region; and the driving the array of pixels in connection with the oscillating wobulation pattern includes driving the array of pixels to display, based on the wider projection channel, the first image with a different brightness level than is used to display the second image or the third image.
4. The method of any of the preceding examples, wherein the oscillating wobulation pattern is a multitone sinusoidal pattern characterized by a composite sinusoidal function including a sinusoid and a harmonic of the sinusoid.
5. The method of any of the preceding examples, wherein: the first region, the second region, and the third region are associated with equal portions of time within the period; the first region, the second region, and the third region are associated with equal projection channel widths.
6. The method of any of the preceding examples, wherein the harmonic of the sinusoid is a ninth harmonic or an eleventh harmonic.
7. The method of any of the preceding examples, wherein the oscillating wobulation pattern is a stepped pattern characterized by a step function having a periodic sequence of: a first segment with an intermediate value for one time unit, a second segment with a minimum value for two time units, a third segment with the intermediate value for one time unit, and a fourth segment with a maximum value for two time units.
8. The method of any of the preceding examples, wherein the array of pixels having the non-rectilinear arrangement includes pixels with non-uniform sizes.
9. The method of any of the preceding examples, wherein: a plurality of red pixels within the array of pixels are of a first size; a plurality of blue pixels within the array of pixels are of a second size; a plurality of green pixels within the array of pixels are of the second size; and the first size is larger than the second size.
10. The method of any of the preceding examples, wherein the array of pixels having the non-rectilinear arrangement includes pixels with non-uniform shapes.
11. The method of any of the preceding examples, wherein: a plurality of red pixels within the array of pixels are of a hexagonal shape; a plurality of blue pixels within the array of pixels are of a triangular shape; and a plurality of green pixels within the array of pixels are of the triangular shape.
12. The method of any of the preceding examples, wherein the optical plate is a glass plate configured to allow light from the array of pixels to pass through at an angle determined by how far the glass plate is displaced in accordance with the oscillating wobulation pattern.
13. The method of any of the preceding examples, wherein the first image, the second image, and the third image are each different subframes of an image frame included in a frame sequence presented by the array of pixels.
14. The method of any of the preceding examples, wherein the array of pixels is implemented by micro-LED elements of a micro-LED panel included in a head-mounted display of an extended reality presentation device.
15. A method comprising: for an actuator on which an optical plate is mounted so as to be positioned in front of an array of pixels having a non-rectilinear arrangement, driving the actuator to displace the optical plate in accordance with an oscillating wobulation pattern along a single rotational axis; driving the array of pixels to display a first subframe of an image frame while the optical plate is in a first region of a period of the oscillating wobulation pattern; driving the array of pixels to display a second subframe of the image frame while the optical plate is in a second region of the period of the oscillating wobulation pattern; and driving the array of pixels to display a third subframe of the image frame while the optical plate is in a third region of the period of the oscillating wobulation pattern.
16. The method of any of the preceding examples, wherein: the oscillating wobulation pattern is a multitone sinusoidal pattern characterized by a composite sinusoidal function including a sinusoid and a harmonic of the sinusoid; the first region, the second region, and the third region are associated with equal portions of time within the period; and the first region, the second region, and the third region are associated with equal projection channel widths.
17. The method of any of the preceding examples, wherein the array of pixels having the non-rectilinear arrangement includes pixels with non-uniform sizes and non-uniform shapes, including: a plurality of red pixels having a first size and a hexagonal shape; a plurality of blue pixels having a second size and a triangular shape; and a plurality of green pixels having the second size and the triangular shape; wherein the first size is larger than the second size.
18. A display system comprising: an optical plate; an array of pixels having a non-rectilinear arrangement; an actuator on which the optical plate is mounted so as to be positioned in front of the array of pixels, the actuator being configured to displace the optical plate in accordance with an oscillating wobulation pattern along a single rotational axis; and a pixel controller configured to drive the array of pixels to display: a first image while the optical plate is in a first region of a period of the oscillating wobulation pattern, a second image while the optical plate is in a second region of the period of the oscillating wobulation pattern, and a third image while the optical plate is in a third region of the period of the oscillating wobulation pattern.

19. The display system of any of the preceding examples, wherein: the oscillating wobulation pattern is a multi-tone sinusoidal pattern characterized by a composite sinusoidal function including a sinusoid and a harmonic of the sinusoid; the first region, the second region, and the third region are associated with equal portions of time within the period; and the first region, the second region, and the third region are associated with equal projection channel widths.

20. The display system of any of the preceding examples, wherein the array of pixels having the non-rectilinear arrangement includes pixels with non-uniform sizes and non-uniform shapes, including: a plurality of red pixels having a first size and a hexagonal shape; a plurality of blue pixels having a second size and a triangular shape; and a plurality of green pixels having the second size and the triangular shape; wherein the first size is larger than the second size.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the description and claims. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Specific structural and functional details disclosed herein are merely representative for purposes of describing example implementations. Example implementations, however, may be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A method comprising:
   displacing an optical plate in accordance with an oscillating wobulation pattern along a single rotational axis, the optical plate being positioned in front of an array of pixels having a non-rectilinear pixel arrangement; and
   driving the array of pixels in connection with the oscillating wobulation pattern such that:
   the array of pixels displays a first image while the optical plate is in a first region of a period of the oscillating wobulation pattern,
   the array of pixels displays a second image while the optical plate is in a second region of the period of the oscillating wobulation pattern, and
   the array of pixels displays a third image while the optical plate is in a third region of the period of the oscillating wobulation pattern.

2. The method of claim 1, wherein the oscillating wobulation pattern is a monotone sinusoidal pattern characterized by a sinusoidal function.

3. The method of claim 2, wherein:
   the first region, the second region, and the third region are associated with equal portions of time within the period;
   the first region is associated with a wider projection channel than the second region or the third region; and
   the driving the array of pixels in connection with the oscillating wobulation pattern includes driving the array of pixels to display, based on the wider projection channel, the first image with a different brightness level than is used to display the second image or the third image.

4. The method of claim 1, wherein the oscillating wobulation pattern is a multitone sinusoidal pattern characterized by a composite sinusoidal function including a sinusoid and a harmonic of the sinusoid.

5. The method of claim 4, wherein:
   the first region, the second region, and the third region are associated with equal portions of time within the period; and
   the first region, the second region, and the third region are associated with equal projection channel widths.

6. The method of claim 4, wherein the harmonic of the sinusoid is a ninth harmonic or an eleventh harmonic.

7. The method of claim 1, wherein the oscillating wobulation pattern is a stepped pattern characterized by a step function having a periodic sequence of:
   a first segment with an intermediate value for one time unit,
   a second segment with a minimum value for two time units,
   a third segment with the intermediate value for one time unit, and
   a fourth segment with a maximum value for two time units.

8. The method of claim 1, wherein the array of pixels having the non-rectilinear pixel arrangement includes pixels with non-uniform sizes.

9. The method of claim 8, wherein:
   a plurality of red pixels within the array of pixels are of a first size;
   a plurality of blue pixels within the array of pixels are of a second size;
   a plurality of green pixels within the array of pixels are of the second size; and
   the first size is larger than the second size.

10. The method of claim 1, wherein the array of pixels having the non-rectilinear pixel arrangement includes pixels with non-uniform shapes.

11. The method of claim 10, wherein:
    a plurality of red pixels within the array of pixels are of a hexagonal shape;
    a plurality of blue pixels within the array of pixels are of a triangular shape; and
    a plurality of green pixels within the array of pixels are of the triangular shape.

12. The method of claim 1, wherein the optical plate is a glass plate configured to allow light from the array of pixels to pass through at an angle determined by how far the glass plate is displaced in accordance with the oscillating wobulation pattern.

13. The method of claim 1, wherein the first image, the second image, and the third image are each different subframes of an image frame included in a frame sequence presented by the array of pixels.

14. The method of claim 1, wherein the array of pixels is implemented by micro-LED elements of a micro-LED panel included in a head-mounted display of an extended reality presentation device.

15. A method comprising:
    for an actuator on which an optical plate is mounted so as to be positioned in front of an array of pixels having a non-rectilinear arrangement, driving the actuator to displace the optical plate in accordance with an oscillating wobulation pattern along a single rotational axis;
    driving the array of pixels to display a first subframe of an image frame while the optical plate is in a first region of a period of the oscillating wobulation pattern;
    driving the array of pixels to display a second subframe of the image frame while the optical plate is in a second region of the period of the oscillating wobulation pattern; and
    driving the array of pixels to display a third subframe of the image frame while the optical plate is in a third region of the period of the oscillating wobulation pattern.

16. The method of claim 15, wherein:
    the oscillating wobulation pattern is a multitone sinusoidal pattern characterized by a composite sinusoidal function including a sinusoid and a harmonic of the sinusoid;
    the first region, the second region, and the third region are associated with equal portions of time within the period; and
    the first region, the second region, and the third region are associated with equal projection channel widths.

17. The method of claim 15, wherein the array of pixels having the non-rectilinear arrangement includes pixels with non-uniform sizes and non-uniform shapes, including:
    a plurality of red pixels having a first size and a hexagonal shape;
    a plurality of blue pixels having a second size and a triangular shape; and
    a plurality of green pixels having the second size and the triangular shape;
    wherein the first size is larger than the second size.

18. A display system comprising:
    an optical plate;
    an array of pixels having a non-rectilinear arrangement;

an actuator on which the optical plate is mounted so as to be positioned in front of the array of pixels, the actuator being configured to displace the optical plate in accordance with an oscillating wobulation pattern along a single rotational axis; and a pixel controller configured to drive the array of pixels to display:
- a first image while the optical plate is in a first region of a period of the oscillating wobulation pattern,
- a second image while the optical plate is in a second region of the period of the oscillating wobulation pattern, and
- a third image while the optical plate is in a third region of the period of the oscillating wobulation pattern.

19. The display system of claim 18, wherein:
the oscillating wobulation pattern is a multitone sinusoidal pattern characterized by a composite sinusoidal function including a sinusoid and a harmonic of the sinusoid;

the first region, the second region, and the third region are associated with equal portions of time within the period; and the first region, the second region, and the third region are associated with equal projection channel widths.

20. The display system of claim 18, wherein the array of pixels having the non-rectilinear arrangement includes pixels with non-uniform sizes and non-uniform shapes, including:
- a plurality of red pixels having a first size and a hexagonal shape;
- a plurality of blue pixels having a second size and a triangular shape; and
- a plurality of green pixels having the second size and the triangular shape;

wherein the first size is larger than the second size.

* * * * *